No. 725,321. PATENTED APR. 14, 1903.
S. C. C. CURRIE.
APPARATUS FOR TREATING ORES.
APPLICATION FILED APR. 17, 1902.
NO MODEL.
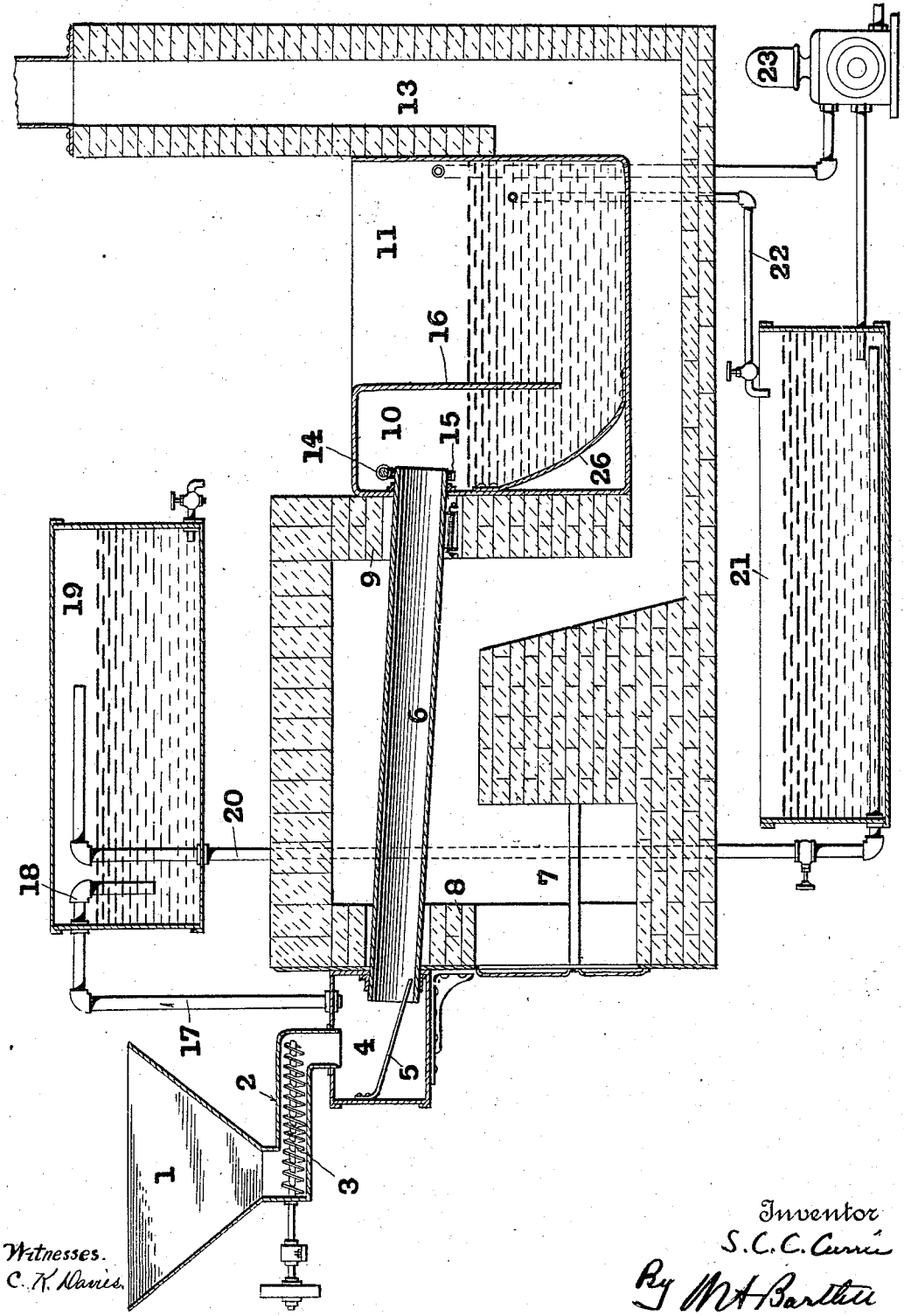
Witnesses.
C. K. Davis.
M. E. Brown
Inventor
S. C. C. Currie
By M. H. Bartlett
Attorney

UNITED STATES PATENT OFFICE.

STANLEY C. C. CURRIE, OF NEW YORK, N. Y., ASSIGNOR OF ONE-HALF TO WILLIAM COURTENAY, OF NEW YORK, N. Y.

APPARATUS FOR TREATING ORES.

SPECIFICATION forming part of Letters Patent No. 725,321, dated April 14, 1903.

Application filed April 17, 1902. Serial No. 103,400. (No model.)

*To all whom it may concern:*

Be it known that I, STANLEY C. C. CURRIE, residing at New York, in the county of New York and State of New York, have invented certain new and useful Improvements in Apparatus for Treating Ores, of which the following is a specification, reference being had therein to the accompanying drawing.

This invention relates to mechanism or apparatus for the treatment of ores containing precious metals.

The apparatus hereinafter described has been specially devised for the purpose of submitting what may be called "raw ores" to treatment, wherein steam or steam mixed with air or gas or a gaseous product is applied to the ore, so that some of the metallic salts contained in the ore are transformed into other salts or made more soluble.

The apparatus may be used in operating the process described in my application, Serial No. 73,090, filed August 23, 1901, or a part of such process. It may also be used for the purpose of eliminating volatile substances from the ore under treatment and for the condensation and recovery of such volatile substances.

The figure is a vertical central section of an apparatus for carrying out the above-referred-to and other processes in the art of extracting precious metals from ores.

The numeral 1 indicates a hopper or bin from which pulverized ore is fed by gravity to conveyer 2. The raw pulverized ore is forced along this conveyer by spiral propeller 3, which propeller is driven by any suitable mechanism at such speed as the circumstances of the case may warrant. The conveyer 2 leads to a closed chamber 4 and in this chamber falls on an incline 5. The conveyer is practically closed by the incoming ore, so that gases from chamber 4 cannot escape to any great extent through the conveyer. The incline 5 leads to the upper end of a muffle or heating-drum 6. This "muffle," if it may be so called, is supported in inclined position over a furnace 7, the ends of the drum extending through the walls 8 9 of the furnace. The upper end of the drum extends into the closed chamber 4, outside the furnace-wall. The lower end of the drum extends into a compartment 10 of an alkali-tank 11, said compartment being closed at the top and sides, but having an opening near the bottom into tank 11, as will be explained. The tank 11, of metal, is above the heat of the flue, which leads from furnace 7. The waste heat from the furnace will thus tend to heat the liquid in tank 11 before the heat and smoke escape by uptake 13.

Drum 6 may be made to rotate by any suitable means, as by a worm 14, engaging a pinion 15 on the drum. Rotating drums or muffles in similar relation to ore-furnaces are common and well known.

The tank 11 is made to contain an alkaline or other liquid solution, which extends above the bottom of cover or partition 16 to such an extent as may be desirable to regulate the steam-pressure within the compartment 10. The hot pulverized ore falls from the end of drum 6 into the liquid in compartment 10 and adds to the heat developed in the tank by the furnace. Steam formed in compartment 10 being sealed in said compartment by the liquid below the end of partition 16 must escape through the drum 6 into the chamber 4 and in passing through drum 6 comes in contact with the ore therein, so any chemicals of a volatile nature contained in the tank 11 may be volatilized and the gases passed through drum 6 in like manner. (The purpose of such treatment is explained in the application above referred to.) The steam developed in compartment 10 must pass through the heating-drum and coming in contact with the ore, which is tumbled about by the rotation of said drum, partially oxidizes the ore and renders soluble some of the salts which were before insoluble. The ore falls from the drum into the alkaline bath and some of the salts are there dissolved. Volatile gases developed in the drum or carried back by the steam are received in the chamber 4 and there act to heat and to some extent to soften the incoming ore. The steam and gases evolved by the contact of the steam or gases described (with the ore) pass up pipe 17 and with a return-bend 18 are conveyed into condensing-tank 19, which tank may contain water or other liquid for the condensation of the steam and gases thus introduced. Sulfureted hydrogen or other gas developed in the apparatus will thus find its way to tank 19. From tank 19 the gases may be conveyed by pipe or siphon 20 to the precipitation tank or trough 21.

Tank 11 communicates with precipitation-tank 21 by pipe 22, through which liquid for operation in the precipitation-tank may be drawn by gravity. A circulation-pump 23 can be used, by which the liquid may be forced from tank to tank.

The ore from drum 6 drops onto incline 26 and is propelled into that part of the tank 11 beyond cover or partition 16 and can then be removed by hand or suitable mechanical means for further treatment.

It may be stated that the liquid usually employed in tank 11 is a caustic alkaline solution; but as the Patent Office does not permit an applicant for patent to claim in one application both a process and an apparatus for carrying out that process I do not herein explain all the steps and processes in connection with the extraction of precious metals from their ores to which the mechanism is adapted.

In this application under the requirements of the Patent Office I limit my claims to the mechanism or apparatus and combinations of mechanical elements substantially as hereinafter stated.

What I claim is—

1. In an apparatus for the treatment of ores, an ore-hopper and conveyer leading therefrom, a substantially closed chamber to which said ore is conveyed, an incline in said chamber, and a heating-drum leading from the foot of the incline through a furnace, and means for forcing the heated gases from the drum into the closed chamber, all combined.

2. In an apparatus for the treatment of ores, an ore-hopper and a conveyer leading therefrom, a substantially closed chamber into which said conveyer empties, an incline in said chamber leading material from the conveyer to the inlet end of the heating-drum, the heating-drum, and means for conveying steam to the delivery end thereof, whence it passes through the drum to the closed chamber, and an escape-pipe from said closed chamber, all combined.

3. In an apparatus for treating ore, a heating-drum, a furnace through which said drum passes, a tank at the mouth of said drum, and a heat-flue leading from the furnace to said tank by which the surplus heat of the furnace is conveyed to the tank.

4. In an ore-treating apparatus, the combination of a heating-drum and a furnace through which the drum passes, a tank into which said drum enters outside the furnace, a cover or partition over the end of the drum extending nearly to the bottom of the tank, and an incline under the end of the drum leading to near the edge of the partition.

5. In an ore-treating apparatus, a heating-drum, a tank at the outlet thereof and means for developing steam in said tank and conveying it to the drum, a substantially closed chamber at the inlet of said drum, and a condensing-tank to which said chamber has a passage, all combined.

In testimony whereof I affix my signature in presence of two witnesses.

STANLEY C. C. CURRIE.

Witnesses:
BERTRAM C. SMITH,
GEORGE L. COURTENAY.